INVENTOR.
Louis J. Weber

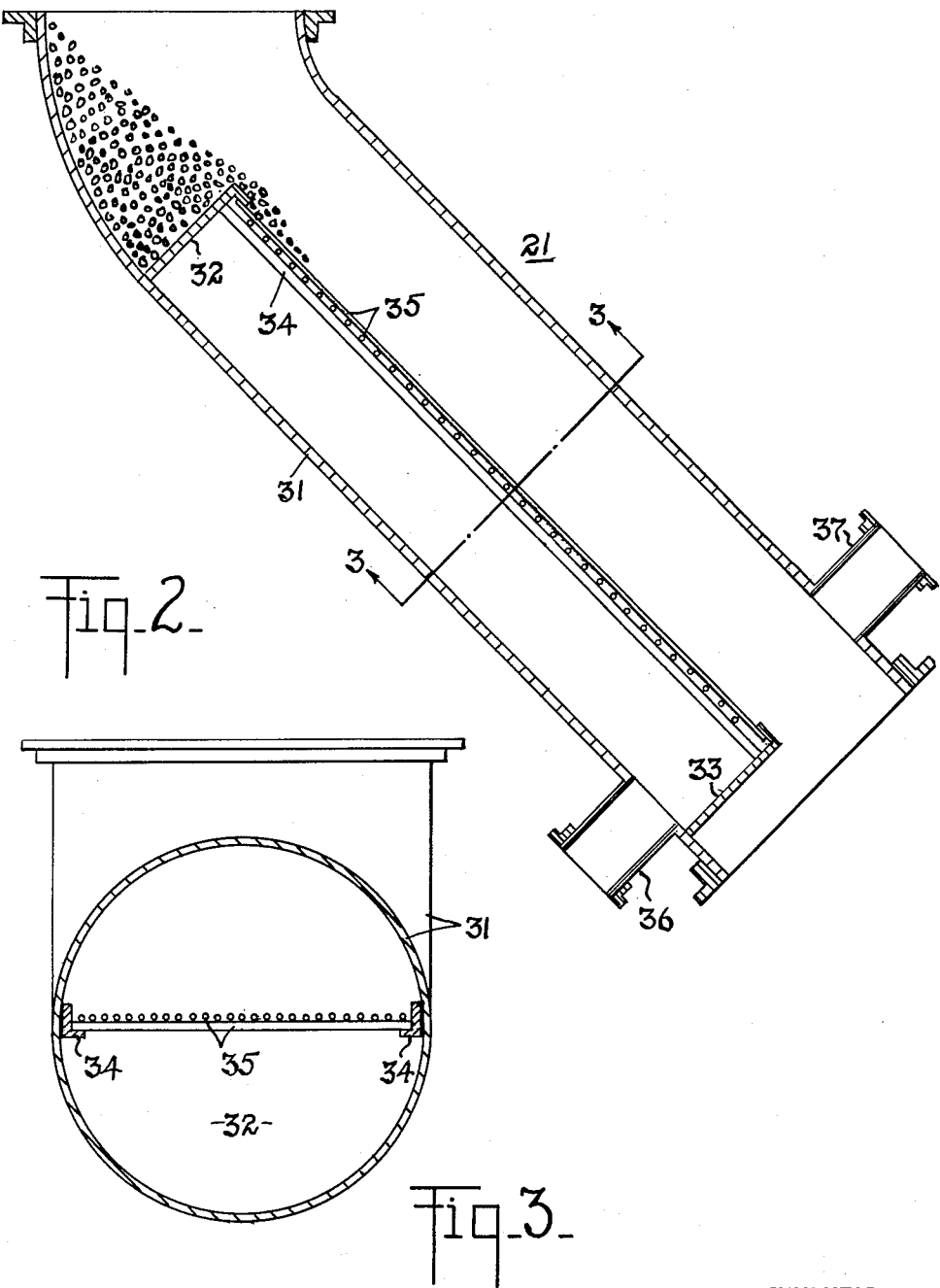

United States Patent Office 2,755,174
Patented July 17, 1956

2,755,174

PRESSURE TIGHT SCREEN IN PEBBLE HEATER UNIT

Louis Joe Weber, Bartlesville, Okla., assignor to Phillips Petroleum Company, a corporation of Delaware Application January 7, 1948, Serial No. 935

1 Claim. (Cl. 23—288)

This invention relates to improvements in chemical apparatus and methods employing pebble heaters with special reference to a combination thereof with means for screening the pebbles.

The subject matter of this invention pertains to an improved apparatus and process for heating gases to effect high temperature conversion of hydrocarbons by contact with a downwardly moving stream of hot pebbles.

Pebble heater operations with which this invention is concerned are being utilized in a variety of chemical processes and treatments in which extremely fast heating of the reactant gas or gases is required. Its application includes conversion of hydrocarbons at high temperatures such as cracking and dehydrogenation, the synthesis of HCN from ammonia and carbon monoxide, the synthesis of $CS_2$ by reacting hydrocarbon vapors with sulfur containing gases and similar conversions. Conventional pebble heater technique entails circulating a continuous mass of pebbles by gravity through a series of chambers or zones, elevating them to a point above the upper chamber and again allowing them to descend by gravity through the several chambers. In a typical hydrocarbon conversion process pebbles are heated in an upper chamber by contact with a countercurrent stream of hot flue gas, after which they pass through a conversion chamber wherein they heat the hydrocarbons being processed to effect the reaction required. In some installations a third chamber is positioned below the conversion chamber to effect some specific step in the process such as the preheating of the feed stock by abstracting the residual heat of the pebbles after they pass through the conversion chamber. Pebbles emerging from the last zone are passed to some type of feeder from which they are delivered at a controlled rate into an elevating mechanism for recycling.

The pebbles in such a pebble heater and conversion unit are continuously subjected to high rates of heating, followed by rapid cooling, in addition to constant movement through numerous conduits and feeding and elevating mechanisms in which considerable impact between pebbles or between pebbles and steel or refractory structures is encountered. Under these conditions the pebbles will suffer a certain amount of attrition by which their size may be continuously reduced and as a result fines or dust is produced. The rapid heating and cooling of the pebbles induces stress and strains in the individual pebbles which ultimately result in the formation and growth of cracks or fissures in the individual pebbles. In some high temperature conversion processes carbon deposits will form and grow in the cracks thus formed and in the pores of the pebbles. All of these conditions cause fracture and rupture of the pebbles to an extent that they are no longer suitable for circulation in the apparatus. This invention is concerned with the removal of attrited and broken pebbles as well as the resulting fines from the mass thereof which is being continuously circulated.

In utilizing pebble heater apparatus to conduct high temperature cracking processes the pebbles should be of a substantially uniform size. If the pebbles become reduced in size the smaller pebble particles will be suspended in the relatively high velocity gas stream in the conversion chamber and will thus be carried by this gas stream into the auxiliary apparatus such as cooling coils, compressors, pumps and valves. It is also desirable to maintain the pebbles of a substantially uniform size and to prevent the accumulation of fines or pebble fragments in the mass of the pebbles so as to insure a minimum pressure drop in all sections of the pebble bed through which the gas streams must pass. Broken pebbles and fines will also tend to block and interfere with the proper functioning of various other parts of the system.

It is an object of this invention to provide means for maintaining pebbles as used in the apparatus at a substantially uniform size.

Another object of this invention is to provide means for eliminating attrited and broken pebbles from the circulating mass of pebbles.

A still further object of this invention is to provide means for withdrawing fractured pebbles and pebble fragments together with fines or dust from a pebble heater apparatus.

A still further object of this invention is to provide means for adding fresh pebbles to the apparatus.

It is another object of the invention to provide a novel method of high temperature hydrocarbon conversions wherein, as a part thereof, the size of the pebbles is maintained within a given range and the smaller size particles are removed, preferably under conditions of high temperatures and superatmospheric pressures.

Other and more detailed objects of the invention will be apparent from the following disclosure.

This invention resides substantially in the combination, construction, arrangement, relative location of parts, steps and series of steps, all as hereinafter fully explained.

In the accompanying drawings:

Figure 2 is a longitudinal, vertical, central, cross sectional view of the screening element forming part of the system; and Figure 3 is a cross sectional view taken on the line 3—3 of Figure 2.

Figure 1:
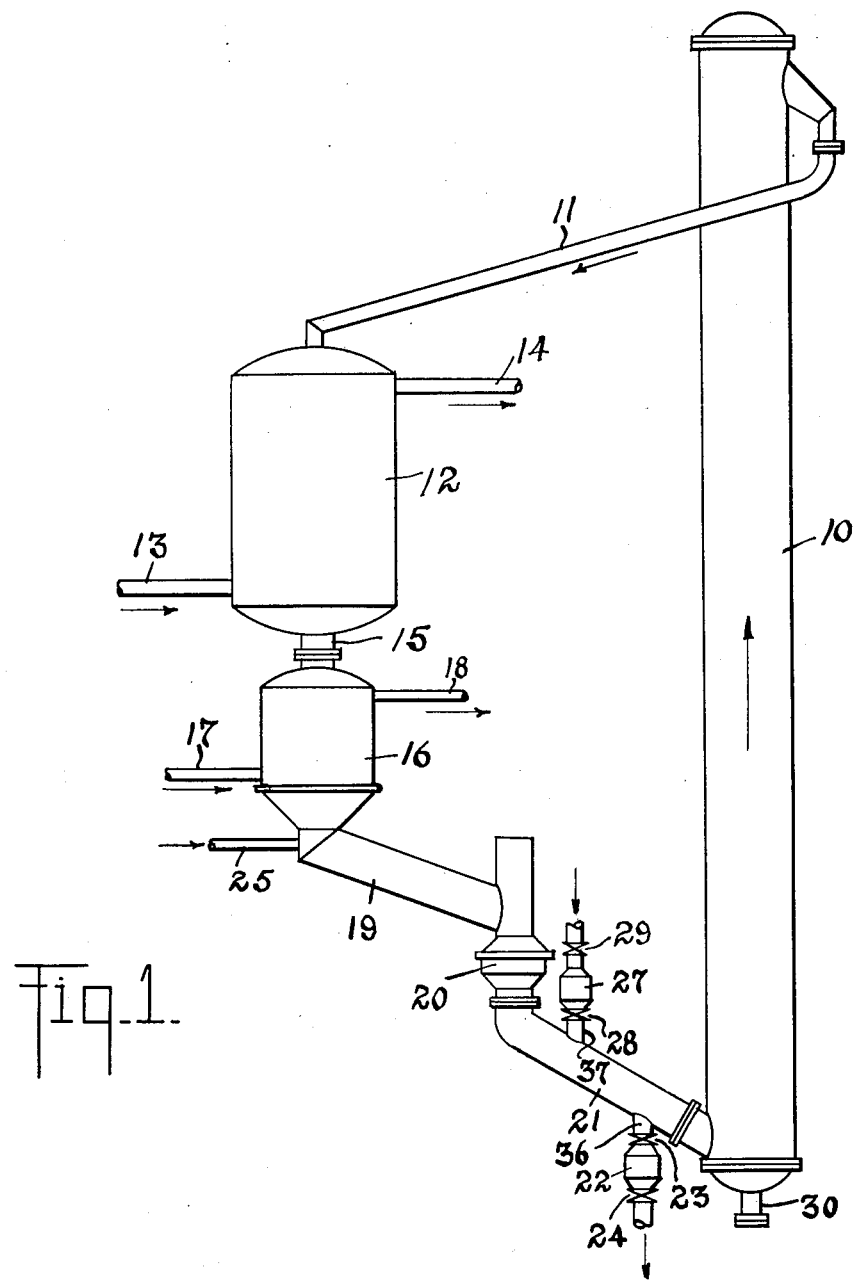
Figure 1 is a vertical elevational view of a pebble heater high temperature hydrocarbon conversion apparatus employing the principles of this invention and illustrated somewhat diagrammatically.

The term "pebble" as referred to throughout this disclosure is defined as any particulate contact material which is readily flowable through a series of contact zones or chambers. This material is in the form of pebbles, preferably spherical in form, and which range in size from about ⅛" to 1", but spheres ranging from about ¼" to ½" in size are the most practical. Uniform shapes are preferred but pebbles of slightly irregular shape may be used. These pebbles may be of ceramic or refractory material such as alumina, mullite, magnesia, zircon and the like or of metals and alloys such as iron, nickel, Monel and Inconel. The pebbles may be used entirely as a heat transfer medium but they may also have catalytic activity by the incorporation therein or thereon of catlytic material such as silica-alumina.

Referring to the drawings, the elevator 10 diagrammatically illustrates any suitable mechanism for raising the pebbles from the low point of the system to the high point thereof and may consist for example, of a bucket conveyor within a housing. The pebbles are discharged from the conveyor at the top of the housing into the conduit 11 by means of which they are conducted by gravity into the pebble heater 12. Pebble heaters are well known in the art as well as the details of construction thereof. The pebbles collect within the heater 12 to form a bed through which the heating gas such as flue gas travels upwardly after delivery to the heater through the line 13 and are withdrawn from the heater at the top of the bed through the line 14.

From the heater 12 the pebbles pass through a throat connection 15 into the reactor or conversion vessel 16 to which is delivered, through the line 17, the hydrocarbon gas or gas mixture to be converted and from which the conversion products and unreacted gases are withdrawn by line 18 for further processing.

The still hot pebbles are delivered from the reactor 16 by the conduit 19 to a feeding device 20, the details of construction of which have not been illustrated as devices of this kind are commercially available. The purpose of the feeding device 20 is to control the rate of travel of the pebbles through the pebble heater 12 and reactor 16. It will be readily understood that if the feeder 20 controls the rate of withdrawal of the pebbles from the reactor 16 it will control the rate of gravity travel of the pebbles through the critical portion of the system. From the feeding device 20 the pebbles fall into a screening device 21 and after the separation of undersized particles and fines therefrom are delivered by gravity into the bottom of the elevator 10 where they are picked up by the vertical conveyor and returned to the heater 12 through the line 11.

Referring to Figures 2 and 3, the screening element 21 is shown comprising a cylindrical housing 31 constructed so as to normally lie at an angle of inclination which practice prefers to be of the order of 35°. The ends of the housing are provided with means for facilitating its attachment to the feeder 20 and the conveyor 10. Within this housing are a pair of semi-circular walls 32 and 33 fixed at substantially the opposite ends of the housing and between which a pair of angle irons or other suitable supports 34 extend longitudinally of the housing. Supported upon the angle irons is a screen or grizzlie having properly sized openings to effect the separation of undersized fragments and particles from the pebbles.

As shown in Figure 1, a connection 25 is provided for supplying a suitable sealing vapor depending upon the nature of the process which in some cases may be steam, to the point of connection between the bottom of reactor 16 and the conduit 19. Normally, the system will be full of pebbles at this point and the introduction of a small amount of sealing vapor such as steam will serve to prevent any considerable flow of reaction vapors through conduit 19, screen housing 21 and elevator 10 although a small amount of the steam may pass into the reactor 16.

The housing 31 is provided with a pair of integral branches or extensions 36 and 37 on which may be respectively mounted the pots or hoppers 22 and 27 by means of which the fines and broken pebble particles may be removed from the screen housing and fresh pebbles introduced thereinto. The pot 27 has been illustrated in Figure 1 at a slightly different point that it would be located when mounted on the connection 37 of Figure 2. This does not represent an intended difference but with respect to Figure 1 merely comprises a rearrangement in this respect so as not to crowd the parts together on Figure 1. The conduit which includes the pot 22 includes suitable valves 23 and 24 at the entrance and exit thereof to provide a sort of double trap door so that the particles to be withdrawn from the screen housing are introduced into the pot 22 by opening valve 23 while valve 24 remains closed. The material collected in the pot is then withdrawn from the system by closing valve 23 and opening valve 24. This insures that the gaseous atmosphere of the screen housing will not be lost during this operation. In a similar way the conduit for pot 27 is provided with the valves 28 and 29 so that fresh pebbles can be introduced into the screen housing without loss of atmosphere.

To further aid in practicing the invention, the housing 31 of the screen chamber is preferably formed of carbon steel while the screen element 35 is formed from 18–8 chrome nickel steel. The rods forming the screen are about $\frac{3}{16}''$ in diameter and are laid in a grid like fashion to provide about $\frac{1}{4}''$ opening between adjacent rods. In one installation the screen element proper is one foot wide and the housing 31 is a 14" outside diameter casing. The pebbles are circulated through the apparatus and over the screen at about 27 tons per hour. The pebbles are of alumina and of about $\frac{3}{8}''$ diameter and have a temperature of about 600° F. to 1000° F., at the time they pass over the screen and into the elevating mechanism. The screen chamber is operated at a positive internal pressure in the range of about ½ to 10 pounds per square inch gage. The atmosphere in the screening chamber normally comprises steam or flue gas but in some instances may contain small quantities of the gaseous hydrocarbons being reacted in the conversion chamber.

This apparatus is being used for the high temperature cracking of light normally gaseous hydrocarbons such as methane, ethane and propane to produce olefins, principally ethylene. The temperature in the conversion chamber or reactor is about 1750° F. but may range from 1500° F. to 3000° F. The temperature in the pebble heating chamber is about 2400° F. but may range from about 1600° F. to about 3500° F.

The flue gasses for heating the pebbles in the heater 12 may be brought to a temperature in an external heater or may be generated directly in the lower zone of the pebble heater and allowed to pass upwardly through a suitable separating means (not shown) into the upper pebble heating zone as will be understood by those skilled in the art.

It will be recognized that the conduit 15 provides a throat such as is commonly used to provide communication between the pebble heater and the reactor.

The entrance end of the screen housing 31 is preferably placed in vertical alignment on the axis of the reactor 16 as shown. As a result, the construction of Figure 2 provides the practical feature that a bed of pebbles collects at the bottom of he curved entrance end of the housing 31 against the baffle wall 32 as shown in Figure 2 so that the incoming pebbles will drop onto the stagnant bed of pebbles piled up against the wall 32 so as to cushion the oncoming pebbles and thereby prevent severe abrasion of the carbon steel wall of the conduit housing 31 at this point and to some extent to minimize the tendency of the pebbles to fracture as a result of dropping from the bottom of the reactor 16 into the screen housing.

In some processes with which this invention may be used as suggested above it is not necessary to use a sealing vapor at the bottom of the reactor. In these cases it is quite possible that the elevator 10, screening unit 21 and conduit 19 will be filled with flue gas from the heater 12. It is also possible under some conditions for a small quantity of the gases being treated in the reactor 16 to pass into conduit 19, chamber 21 and elevator 10. However, in this case this transfer of fugitive gases and vapors will not materially effect the operation of the apparatus or the quantity and quality of the reaction products produced thereby.

From the above description it will be apparent to those skilled in the art that the subject matter of this invention is capable of some variation in details and I do not therefore desire to be strictly limited to the embodiment herein disclosed for illustrative purposes.

What is claimed is:

A closed heat transfer system employing refractory pebbles as a heat transfer medium in a hydrocarbon gas conversion unit comprising a first vessel heated to form a heater, an inlet conduit attached to the upper section of said vessel to feed pebbles thereto and an outlet conduit attached to the lower section of said vessel to conduct pebbles therefrom, a second vessel comprising a reactor having said pebble outlet conduit connected to its upper section, said reactor also having a pebble outlet conduit at its lower section, reaction gas inlet and outlet conduits connected to said reactor to facilitate countercurrent contact of pebbles and reaction gas, a pebble flow control valve in said pebble outlet conduit from the reactor, a conduit enclosed pebble screening device positioned below said reactor and connected to the pebble outlet conduit from said reactor, said device being inclined from the horizontal to induce gravity flow of pebbles over said screening device, said screening device consisting of two sets of parallel bars spaced in accordance with the particle size it is desired to maintain supported substantially at a central plane of said conduit, the upper surface of said screening device consisting of parallel bars running longitudinally, the under surface thereof consisting of bars similarly spaced and running transversely, the parallel bars of said upper surface being mounted in end connectors within conduit of substantially uniform cross section, which connectors are substantially perpendicular to the enclosing conduit surface so that a layer of pebbles is accumulated immediately before the screening device to cushion the fall of pebbles thereto, a connection from the conduit enclosing the pebble screening device to a conveyor to return the pebbles to the heating zone for recirculation in the system, and a pebble fragment and fines removal connection in the end of said screening zone.

References Cited in the file of this patent

UNITED STATES PATENTS

| | | |
|---|---|---|
| 1,030,653 | Dyer | June 25, 1912 |
| 1,977,684 | Lucke | Oct. 23, 1934 |
| 2,290,580 | Degnen et al. | July 21, 1942 |
| 2,398,954 | Odell | Apr. 23, 1946 |
| 2,432,520 | Ferro, Jr. | Dec. 16, 1947 |
| 2,434,843 | Fahnestock et al. | Jan. 20, 1948 |
| 2,441,170 | Rose et al. | May 11, 1948 |
| 2,444,258 | Johnson | June 29, 1948 |
| 2,486,627 | Arnold | Nov. 1, 1949 |